United States Patent
Bae et al.

(10) Patent No.: US 12,037,442 B2
(45) Date of Patent: Jul. 16, 2024

(54) POST-TREATMENT METHOD OF VINYL CHLORIDE-BASED POLYMER AND CLOSED POST-TREATMENT SYSTEM FOR THE SAME

(71) Applicant: LG CHEM, LTD., Seoul (KR)

(72) Inventors: Heung Kwon Bae, Daejeon (KR); Hyun Min Lee, Daejeon (KR); Kyung Seog Youk, Daejeon (KR); Joong Chul Lim, Daejeon (KR); Se Woong Lee, Daejeon (KR); Jung Rae Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 704 days.

(21) Appl. No.: 17/264,750

(22) PCT Filed: Jun. 22, 2020

(86) PCT No.: PCT/KR2020/008084
§ 371 (c)(1),
(2) Date: Jan. 29, 2021

(87) PCT Pub. No.: WO2021/020733
PCT Pub. Date: Feb. 4, 2021

(65) Prior Publication Data
US 2022/0348695 A1    Nov. 3, 2022

(30) Foreign Application Priority Data
Jul. 26, 2019    (KR) .......... 10-2019-0090848

(51) Int. Cl.
*C08F 6/00*    (2006.01)
*C08F 2/01*    (2006.01)
(Continued)

(52) U.S. Cl.
CPC ............. *C08F 6/16* (2013.01); *C08F 2/01* (2013.01); *C08F 6/003* (2013.01); *C08F 6/008* (2013.01); *C08F 14/06* (2013.01)

(58) Field of Classification Search
CPC .............. C08F 6/00; C08F 6/16; C08F 14/06
See application file for complete search history.

(56) References Cited

U.S. PATENT DOCUMENTS 4,158,092 A * 6/1979 Botsch ............ B01D 1/16
159/DIG. 10
4,526,656 A * 7/1985 Okada ............ B01D 3/16
261/DIG. 26
(Continued)

FOREIGN PATENT DOCUMENTS

CN    106459260    *  2/2017    ........... C08F 6/16
GB    1254812 A    11/1971
(Continued)

*Primary Examiner* — Caixia Lu
(74) *Attorney, Agent, or Firm* — BRYAN CAVE LEIGHTON PAISNER LLP

(57) ABSTRACT

The present invention provides a post-treatment method of a vinyl chloride-based polymer including: (a) preparing a stream containing vinyl chloride-based polymer powder and unreacted vinyl chloride-based monomers by drying a vinyl chloride-based polymer latex in a drying unit; (b) filtering the stream containing the vinyl chloride-based polymer powder and the unreacted vinyl chloride-based monomers in a filtering unit; and (c) recirculating a gas containing the unreacted vinyl chloride-based monomers discharged from the filtering unit to a latex storage unit.

10 Claims, 1 Drawing Sheet

(51) Int. Cl.
*C08F 6/16* (2006.01)
*C08F 14/06* (2006.01)

(56) References Cited

U.S. PATENT DOCUMENTS

| | | |
|---|---|---|
| 5,698,666 A | 12/1997 | Burroway et al. |
| 5,962,614 A | 10/1999 | Burroway et al. |
| 6,288,211 B1 | 9/2001 | Yoshida et al. |
| 2009/0137744 A1 | 5/2009 | Ferguson et al. |
| 2016/0340452 A1 * | 11/2016 | Youk .................... C08F 6/24 |

FOREIGN PATENT DOCUMENTS

| | | | |
|---|---|---|---|
| JP | 63295608 A | 12/1988 | |
| JP | 07113044 B2 | 12/1995 | |
| JP | 10081757 A | 3/1998 | |
| JP | 10176011 A | 6/1998 | |
| JP | 11147911 A | 6/1999 | |
| JP | 2002060416 A | 2/2002 | |
| JP | 2003213008 A | 7/2003 | |
| JP | 2004143329 A | 5/2004 | |
| JP | 3886856 B2 | 2/2007 | |
| KR | 10-0787340 B1 | 12/2007 | |
| KR | 10-1202627 B1 | 11/2012 | |
| KR | 10-20150025805 A | 3/2015 | |
| WO | 2015183006 A1 | 12/2015 | |

\* cited by examiner

POST-TREATMENT METHOD OF VINYL CHLORIDE-BASED POLYMER AND CLOSED POST-TREATMENT SYSTEM FOR THE SAME

The present application is a National Phase entry of International Application No. PCT/KR2020/008084 filed on Jun. 22, 2020, and claims priority to and the benefit of Korean Patent Application No. 10-2019-0090848, filed on Jul. 26, 2019, in the Korean Intellectual Property Office, the disclosures of which are incorporated herein in their entirety by reference.

FIELD

The present invention relates to a post-treatment method of a vinyl chloride polymer and a closed post-treatment system for the same.

BACKGROUND

A vinyl chloride-based polymer, which is a resin containing 50% or more of a vinyl chloride, is inexpensive, easy to control hardness, and applicable to most processing machines, and thus has a variety of application fields. In addition, the vinyl chloride-based polymer is widely used in various fields because the vinyl chloride-based polymer may provide a molded article having excellent physical and chemical properties, such as mechanical strength, weather resistance, and chemical resistance.

This vinyl chloride-based polymer is prepared in various forms according to the application thereof. For example, a vinyl chloride-based polymer for straight processing such as an extrusion process, a calendar process, and an injection process is generally prepared by suspension-polymerization, a vinyl chloride-based polymer for paste processing such as dipping, spraying, and coating is prepared by emulsion polymerization.

The vinyl chloride-based polymer for paste processing is by spray drying a vinyl chloride-based polymer latex obtained through emulsion polymerization to thereby form final resin particles. While the vinyl chloride-based polymer undergoes such a drying process and a subsequent filtering process, a large amount of unreacted residual vinyl chloride monomers is discharged into the atmosphere.

Meanwhile, a vinyl chloride monomer is a primary carcinogen, and industries continue to attempt to reduce the level of the vinyl chloride monomer to less than 1 ppm in the final resin. For example, for PVC-based foils for medical applications, the level of residual monomers should be less than 50 ppb.

As such, the vinyl chloride monomer is a very toxic material, and efforts have been made to minimize the vinyl chloride monomer discharged into the atmosphere. For example, a method of performing a stripping process before drying a latex has been proposed.

As an example of the stripping process, there is a steam stripping method or a method using a vacuum. The steam stripping method is a method in which monomers trapped inside thereof are volatilized using heat. The vacuum method is a method in which monomers contained therein are diffused by applying vacuum to an aqueous emulsion.

However, in the case of removing residual monomers in a latex by using steam or vacuum for the latex, or by using both steam and vacuum for the latex as describe above, it is difficult to suppress the formation of coagulum due to the temperature and pressure of the steam, there is a problem due to the generation of foam, and it is necessary to construct additional facilities, thereby resulting in high cost.

Therefore, research has been continuously conducted on a method capable of replacing a conventional stripping process or overcoming the disadvantages of the stripping process. However, in general, when the stripping process is not performed, vinyl chloride monomers are contained in a latex as they are, so that the value thereof reaches 20,000 ppm. In this case, there is a problem in that a large amount of unreacted residual vinyl chloride monomers may be discharged into the atmosphere during a drying process and a subsequent filtering process.

Therefore, there is a demand for development of a new method with which unreacted residual vinyl chloride monomers reduced although the stripping process is not performed, and the content of unreacted vinyl chloride monomers discharged during a drying process may be effectively reduced.

PATENT DOCUMENT

Korean Patent No. 1202627 (Nov. 13, 2012)

SUMMARY

An aspect of the present invention provides a post-treatment method of a vinyl chloride-based polymer capable of reducing the content of unreacted vinyl chloride-based monomers discharged during a drying process, although a stripping process is not performed, and easily separating and recovering the unreacted vinyl chloride monomers.

Another aspect of the present invention provides a post-treatment system for a vinyl chloride-based polymer capable of easily separating and recovering unreacted vinyl chloride monomers, while efficiently reducing the amount of unreacted vinyl chloride monomers discharged.

An embodiment of the present invention provides a post-treatment method of a vinyl chloride-based polymer including: (a) preparing a stream containing vinyl chloride-based polymer powder and unreacted vinyl chloride-based monomers by drying a vinyl chloride-based polymer latex in a drying unit (11); (b) filtering the stream containing the vinyl chloride-based polymer powder and the unreacted vinyl chloride-based monomers in a filtering unit (21); and (c) recirculating a gas containing the unreacted vinyl chloride-based monomers discharged from the filtering unit (21) to a latex storage unit (1).

Another embodiment of the present invention provides a closed post-treatment system for a vinyl chloride-based polymer including a latex storage unit (1); a drying unit (11); a filtering unit (21); and a reflux line (22) installed between the filtering unit (21) and the latex storage unit (1) to transfer a gas containing unreacted vinyl chloride-based monomers discharged from the filtering unit (21) to the latex storage unit (1).

In a post-treatment method and a closed post-treatment system of the present invention, a gas containing unreacted vinyl chloride-based monomers discharged from a filtering unit (21) after a drying process is circulated to a latex storage unit (1), so that the gas containing the unreacted vinyl chloride-based monomers discharged during the drying process is not discharged into the atmosphere, although a stripping process is not performed before the drying process. Therefore, the unreacted vinyl chloride-based monomers discharged into the atmosphere may be blocked fundamentally to thereby prevent air pollution, and it is unnecessary to perform a separate stripping process, so that an additional device or an additional filtering device such as a dust collector is not required, resulting in a reduction in costs. In addition, the unreacted vinyl chloride-based monomers may be easily separated and recovered by using water, and recirculated, thereby providing excellent economic efficiency.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

EXPLANATION OF REFERENCE NUMBERS

Figure 1:
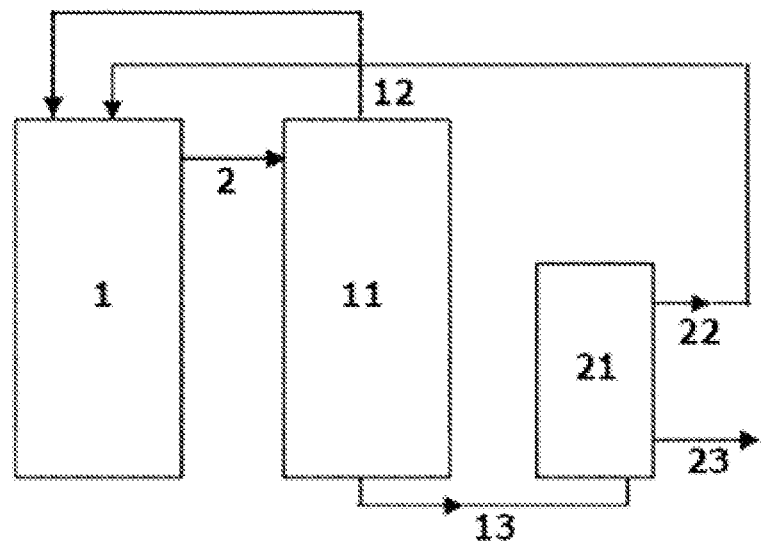
FIG. 1 is a schematic illustration of a post-treatment method of a vinyl chloride-based polymer according to an embodiment of the present invention.
Figure 2:
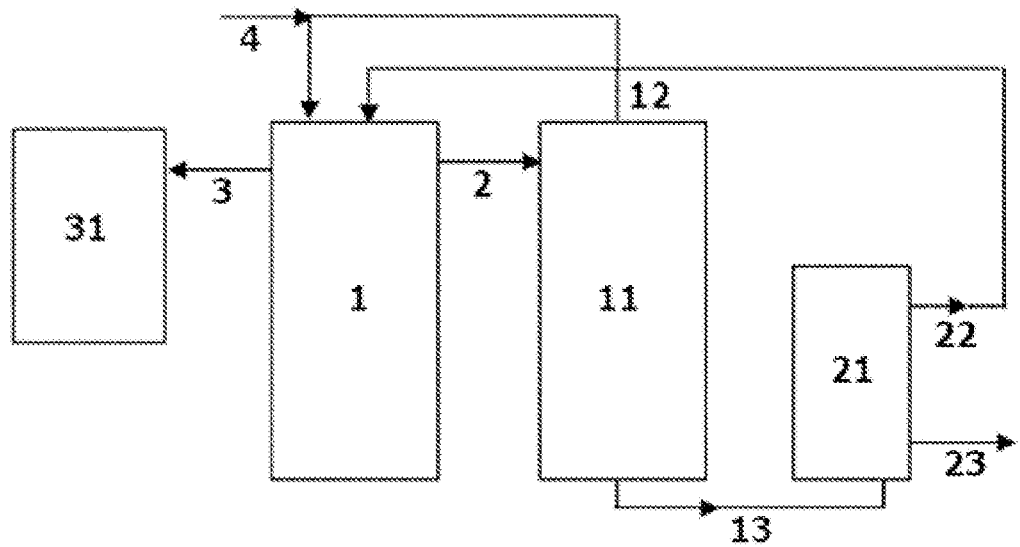
FIG. 2 is a schematic illustration of a post-treatment method of a vinyl chloride-based polymer according to another embodiment of the present invention.

1: latex storage unit
2: latex storage unit rear-stage line
11: drying unit
12: reflux line B
13: drying unit rear-stage line
21: filtering unit
22: reflux line A
23: filtering unit rear-stage line
31: gas holder
3: recovery line
4: water input line

DETAILED DESCRIPTION

Hereinafter, the present invention will be described in more detail in reference to the accompanying drawings to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "vinyl chloride-based polymer" used in the present invention encompasses a compound formed by polymerizing a vinyl chloride-based monomer, and may mean a polymer chain derived from the vinyl chloride-based monomer. Here, the vinyl chloride-based monomer may be purely a vinyl chloride monomer, or those including a vinyl chloride monomer as a main component and a vinyl-based monomer copolymerizable therewith. In the present invention, the vinyl chloride-based polymer may contain 50% by weight or more of a vinyl chloride.

The term used herein, the average particle diameter ($D_{50}$), may be defined as a particle diameter corresponding to 50% of the cumulative number of particles in the particle diameter distribution curve of the particles. The average particle diameter ($D_{50}$) may be measured using, for example, a laser diffraction method. The laser diffraction method is capable of measuring a particle diameter from a submicron range to a range of several millimeters, thereby obtaining results of high reproducibility and high resolution. The average particle diameter ($D_{50}$) may be measured in a wet mode using the Helos device made by Sympatec company.

The term used herein, the "vinyl chloride-based polymer" may mean a vinyl chloride-based polymer solid content unless specifically described as a vinyl chloride-based polymer latex. The term "vinyl chloride-based polymer latex" may mean a material in which vinyl chloride-based polymer particles having an average particle diameter of 0.1 to 2.5 μm are stably dispersed in water.

1. Post-Treatment Method

An embodiment of the present invention provides a post-treatment method of a vinyl chloride-based polymer, the method including: (a) preparing a stream containing vinyl chloride-based polymer powder and unreacted vinyl chloride-based monomers by drying a vinyl chloride-based polymer latex in a drying unit (11); (b) filtering the stream containing the vinyl chloride-based polymer powder and the unreacted vinyl chloride-based monomers in a filtering unit (21); and (c) recirculating a gas containing the unreacted vinyl chloride-based monomers discharged from the filtering unit (21) to a latex storage unit (1).

In addition, the post-treatment method of the present invention may further include polymerizing the vinyl chloride-based monomer to form a vinyl chloride-based polymer latex before the step (a).

The step of polymerizing the vinyl chloride-based monomer to form the vinyl chloride-based polymer latex may be performed by a conventional emulsion polymerization method, and specifically, polymerization may be accomplished by seeded micro suspension polymerization, micro suspension polymerization or emulsion polymerization.

In addition, the post-treatment method of the present invention may further include transferring the vinyl chloride-based polymer latex from the latex storage unit (1) to the drying unit (11) through a latex storage unit rear-stage line (2) before the step (a).

In addition, in the post-treatment method of the present invention, after the step of polymerizing the vinyl chloride-based monomer to form the vinyl chloride-based polymer latex and before the drying step (a), a separate latex stripping process may not be performed.

The stripping process may mean a conventional stripping method such as a stream stripping method using stream of 100° C. or more or a vacuum stripping method using vacuum.

(a) Drying Step

The step (a) of drying the vinyl chloride-based polymer latex in the drying unit (11) to prepare the vinyl chloride-base polymer powder may be performed under conditions of an inlet temperature of 100° C. to 250° C., and specifically, the inlet temperature may be 120° C. to 240° C., 130° C. to 210° C. or 150° C. to 200° C. When the inlet temperature is controlled under the above conditions, it is possible to easily prepare a vinyl chloride-based polymer powder without problems of a decrease in mechanical strength and a degradation of characteristics.

In addition, the drying step (a) may be carried out through spray-drying by using two-fluid spray drying equipment, rotary wheel spray drying equipment, and nozzle spray equipment.

In the post-treatment method of the present invention, the vinyl chloride-based polymer powder prepared in the step (a) may have an average particle diameter of 10 μm to 200 μm, and specifically 30 μm to 150 μm, 40 μm to 100 μm, or 60 μm to 80 μm.

In addition, the post-treatment method of the present invention may further include, after the step (a) and before step (b), a step of transferring the stream containing the vinyl chloride-based polymer powder and unreacted vinyl chloride-based monomers to the filtering unit (21) through a drying unit rear-stage line (13).

(b) Filtering Step

The stream transferred from the drying unit (11) to the filtering unit (21) contains vinyl chloride-based polymer powder and unreacted vinyl chloride-based monomers. In addition, in the filtering step (b) of the present invention, the vinyl chloride-based polymer powder and the unreacted vinyl chloride-based monomers may be separated.

Specifically, the vinyl chloride-based polymer powder may be a dry resin, which is separated from the unreacted vinyl chloride-based monomers in the filtering unit (21), and discharged and recovered through a filtering unit rear-stage line (23). The dry gas containing the unreacted vinyl chloride-based monomers may be transferred from the upper portion of the filtering unit (21) to the latex storage unit (1) through reflux line A (22).

The filtering step (b) may be carried out in the filtering unit (21) having a bag filter, and in this case, the filtering unit (21) may further include at least one among a filter dust collector and an additional filter, as necessary.

In addition, the vinyl chloride-based polymer obtained by filtration in the filtering unit (21) may have an average particle diameter of 10 μm to 200 μm, and specifically 30 μm to 150 μm, 40 μm to 100 μm, or 60 μm to 80 μm.

(c) Recirculating Step

The recirculating step (c) is to recirculate the unreacted vinyl chloride-based monomers discharged from the filtering unit (21) to the latex storage unit (1), and may be performed through the reflux line A (22) installed between the filtering unit (21) and the latex storage unit (1).

In the present invention, the recirculating step (c), it is possible to block the discharge of the dry gas containing the unreacted vinyl chloride-based monomers discharged to the atmosphere, and accordingly, the discharge of the unreacted vinyl chloride-based monomers into the atmosphere may be suppressed. As a result, the content of the unreacted vinyl chloride-based monomers discharged into the atmosphere may substantially converge to 0 ppm, which is eco-friendly.

In addition, the post-treatment method of the present invention may further include a step (c') of recirculating, to the latex storage unit (1), the gas containing the unreacted vinyl chloride-based monomers discharged from the drying unit (11). The recirculating step (c') may be performed through a reflux line B (12) installed between the drying unit (11) and the latex storage unit (1).

(d) Unreacted Vinyl Chloride-Based Monomer Discharge Step

The method of the present invention may further include a step (d) of separating unreacted vinyl chloride-based monomers by adding water to the latex storage unit (1) such that water is added to the upper portion of the latex storage unit (1) through a water feeding line (4).

After the drying process is completed, unreacted vinyl chloride-based monomers transferred from the filtering unit (21), a small amount of residual vinyl chloride-based polymer, and unreacted vinyl chloride-based monomers transferred from the drying unit (11) may be present in the latex storage unit (1). At this time, the unreacted vinyl chloride-based monomers may be present in a gaseous state (which may mean containing steam or gas). The unreacted vinyl chloride-based monomers may be easily separated from the vinyl chloride-based polymer using water, easily recovered, and reused later.

Specifically, the vinyl chloride-based polymer is polymerized using an emulsifier, the emulsifier does not evaporate during a drying process and is located on the surface of the vinyl chloride-based polymer. When water is added, the vinyl chloride-based polymer forms a micelle structure and is dispersed in water by the emulsifier having a hydrophilic group and a lipophilic group. However, the unreacted vinyl chloride-based monomers have very low solubility in water (2.7 g/l, 0.0027% at room temperature under atmospheric pressure), and due to this difference in dispersibility (or solubility), the vinyl chloride-based polymer and the unreacted vinyl chloride-based monomers are easily separated. Thereafter, the unreacted vinyl chloride-based monomers in the latex storage unit (1) are suctioned using a vacuum pump, then transferred to a gas holder (31), and easily recovered. Here, the vacuum pump is not particularly limited, but may be a gas transfer-type vacuum pump. Therefore, the unreacted vinyl chloride-based monomers in the latex storage unit (1) may be suctioned through a suction port of the vacuum pump, then discharged from an exhaust port, and transferred to a gas holder (31) for storage.

In the closed post-treatment method according to the present invention, the dry gas containing the unreacted vinyl chloride-based monomers may be circulated back to the latex storage unit (1) through the reflux line A (22) and the reflux line B (12), and easily separated and recovered using water. Therefore, the unreacted vinyl chloride-based monomers may be easily separated and recovered without a filter dust collector and an additional filter, so that economic efficiency may be excellent, and the dry gas discharged may be significantly reduced or eliminated, thereby preventing air pollution.

2. Closed Post-Treatment System

The present invention provides a closed post-treatment system of a vinyl chloride-based polymer, including a latex storage unit (1); a drying unit (11); a filtering unit (21); and a reflux line A (22) installed between the filtering unit (21) and the latex storage unit (1) to transfer a gas containing unreacted vinyl chloride-based monomers discharged from the filtering unit (21) to the latex storage unit (1).

The closed post-treatment system is characterized by a closed system. The closed system indicates the structure in which the unreacted vinyl chloride-based monomers passed through the drying unit (11) and the filtering unit (21) are circulated to the latex storage unit (1) through the reflux line A (22) and is transferred to the drying unit (11) again. In the opposite meaning, the term, open system, may be used.

By contrast, an open system does not have a reflux line through which the unreacted vinyl chloride-based monomers passed through the drying unit and the filtering unit are circulated to the latex storage unit, and the unreacted vinyl chloride-based monomers are discharged after passing through a filtering unit. In this case, the unreacted vinyl chloride-based monomers are discharged as a dry gas along with fine dust, so that an additional filter dust collector and filter are required in order to separate and recover unreacted vinyl chloride-based monomers to reduce the discharged amount thereof.

The latex storage unit (1) may be a space for storing the vinyl chloride-based polymer latex transferred from a polymerization reactor for polymerizing the vinyl chloride-based monomer to form the vinyl chloride-based polymer latex.

In addition, the closed post-treatment system of the present invention may include a latex storage unit rear-stage line (2) for transferring the vinyl chloride-based polymer latex from the latex storage unit (1) to the drying unit (11).

The drying unit (11) may employ, for example, a spray drying method, and may include devices for two-fluid spray drying, nozzle spray drying, and rotary wheel spray drying.

In addition, as the vinyl chloride-based polymer latex is dried in the drying unit (11) to generate vinyl chloride-based polymer powder, a large amount of unreacted vinyl chloride-based monomers may also be generated. These unreacted vinyl chloride-based monomers may be discharged through the upper portion of the drying unit (11) where the drying step (a) is performed. Therefore, the closed post-treatment system of the present invention may further include a reflux line B (12) installed between the drying unit (11) and the latex storage unit (1) to transfer, to the latex storage unit (1), the unreacted vinyl chloride-based monomers discharged through the upper portion of the drying unit (11).

In addition, the closed post-treatment system of the present invention may further include a drying unit rear-stage line (13) for transferring, to the filtering unit (21), a stream containing the vinyl chloride-based polymer powder and the unreacted vinyl chloride-based monomers.

In addition, the filtering unit (21) may include a bag filter, and may include at least one selected from the group consisting of a filter dust collector and a filter, if necessary.

In addition, the closed post-treatment system of the present invention may include a reflux line A (22) installed between the filtering unit (21) and the latex storage unit (1) to transfer the unreacted vinyl chloride-based monomers discharged through the upper portion of the filtering unit (21) to the latex storage unit (1); and a filtering unit rear-stage line (23) for discharging the vinyl chloride-based polymer powder filtered by the filtering unit (21).

As another example, the closed post-treatment system may include: a latex storage unit (1); a drying unit (11); a filtering unit (21); a gas holder (31); a latex storage unit rear-stage line (2) for transferring a vinyl chloride-based polymer latex from the latex storage unit (1) to the drying unit (11); a reflux line B (12) installed between the drying unit (11) and the latex storage unit (1) to transfer the unreacted vinyl chloride-based monomers discharged through the upper portion of the drying unit (11) to the latex storage unit (1); a drying unit rear-stage line (13) for transferring a stream containing vinyl chloride-based polymer powder and unreacted vinyl chloride-based monomers from the drying unit (11) to the filtering unit (21); a reflux line A (22) installed between the filtering unit (21) and the latex storage unit (1) to transfer the unreacted vinyl chloride-based monomers discharged through the upper portion of the filtration unit (21) to the latex storage unit (1); a filtering unit rear-stage line (23) for discharging the vinyl chloride-based polymer powder filtered by the filtering unit (21); a water input line (4) installed on the upper portion of the latex storage unit (1) for supplying water to the latex storage unit (1); and a recovery line (3) for transferring the unreacted vinyl chloride-based monomers from the latex storage unit (1) to the gas holder (31).

Hereinafter, the present invention will be described in more detail by examples. However, the following examples are for illustrative purposes only, and the scope of the present invention is not limited thereto.

EXAMPLES

Preparation Example

Into a 200 L jacketed reactor equipped with a reflux condenser, 66 kg of a vinyl chloride monomer was added, and then 100 parts by weight of water, 1 part by weight of sodium lauryl sulfate, and 0.6 parts by weight of potassium persulfate were added. After raising a reaction temperature to 60° C., reaction was performed under a reaction pressure of 8.5 KG to 9 KG while maintaining the reaction temperature. Thereafter, when the reaction pressure was lowered to 3.5 KG, unreacted monomers were recovered and a vinyl chloride latex was obtained. In this case, the reflux condenser and the jacketed reactor were thermally insulated to have a shielding effect so that heat loss does not occur during the reaction. The vinyl chloride latex thus prepared was stored in the latex storage unit (1).

Example 1

The vinyl chloride latex, prepared in Preparation Example and stored in the latex storage unit (1), was transferred to the drying unit (11) configured with a rotary wheel spray dryer through a latex storage unit rear-stage line (2), and spray drying was performed by adjusting the inlet temperature to 160° C. and the outlet temperature to 60° C. After a stream containing vinyl chloride-based polymer powder and unreacted vinyl chloride-based monomers was transferred to the filtering unit (21) (bag filter chamber) through the drying unit rear-stage line (13), the vinyl chloride polymer powder having an average particle diameter of 130 μm was obtained from a filtering unit rear-stage line (23) in the lower portion of the filtering unit (21), and a dry gas was circulated to the latex storage unit (1) through the reflux line A (22) above the filtering unit (21). The average particle diameter was measured in a wet mode using the Helos device made by Sympatec company.

Thereafter, water was added to top of latex storage unit (1) through a water input line (4), and then unreacted vinyl chloride monomers are suctioned using a vacuum pump and transferred to a gas holder for recovery.

Comparative Example 1

Before drying the vinyl chloride latex, prepared in Preparation Example stored in the latex storage unit (1) with a spray dryer, the latex was heat-treated for 6 hours using 100° C. steam to perform a latex stripping process. Thereafter, in a rotary wheel spray dryer (drying unit), spray drying was performed by adjusting the inlet temperature to 160° C. and the outlet temperature to 60° C., a vinyl chloride polymer powder having an average particle diameter of 130 μm was obtained from the lower portion of the chamber through a bag filter chamber (filtration part). The average particle diameter was measured in a wet mode using the Helos device made by Sympatec company.

Thereafter, water was added and mixed in the latex storage unit, and then unreacted vinyl chloride monomers are suctioned using a vacuum pump and transferred to a gas holder for recovery.

Examples 2, 3, and Comparative Examples 2 to 6

As shown in Table 1 below, a post-treatment process was performed vinyl chloride-based polymers prepared in Examples 2 and 3 and Comparative Examples 2 to 6 by varying conditions such as the inlet temperature and outlet temperature of a spray dryer (drying unit), the average particle diameter of the obtained vinyl chloride-based polymer powder, whether to perform latex stripping, and a dry gas filtration method.

TABLE 1

| Division | Inlet temperature (° C.) | Outlet temperature (° C.) | Average particle diameter (μm) | Latex stripping | Dry gas filtration method |
|---|---|---|---|---|---|
| Example 1 | 160 | 60 | 130 | x | closed system |
| Example 2 | 180 | 60 | 140 | x | |
| Example 3 | 200 | 60 | 144 | x | |
| Comparative Example 1 | 160 | 60 | 130 | o | open system |
| Comparative Example 2 | 180 | 60 | 140 | o | |
| Comparative Example 3 | 200 | 60 | 144 | o | |
| Comparative Example 4 | 160 | 60 | 130 | x | |
| Comparative Example 5 | 180 | 60 | 140 | x | |
| Comparative Example 6 | 200 | 60 | 144 | x | |

Experimental Example

For vinyl chloride polymers prepared in Examples and Comparative Examples, the concentration of vinyl chloride monomers discharged to the atmosphere after the post-treatment process, the concentration of vinyl chloride monomers in the vinyl chloride polymer, and the recovery rate of unreacted vinyl chloride monomers were measured, and the results thereof are shown in Table 2 below.

(1) Concentration of Vinyl Chloride Monomer Discharged

The dry gas discharged from the a bag filter chamber rear-stage line was collected by using an HS-GC/SIM mode, 20 ml of the dry gas was injected into a sample injector heated to 90° C., and analyzed (STD 20 μg/2 ml).

(2) Concentration of Vinyl Chloride Monomer in Vinyl Chloride Polymer 1 part by weight of each vinyl chloride polymer powder was added to 100 parts by weight of a tetrahydrofuran (THF) solution and dissolved at room temperature, and thereafter a supernatant was extracted with methanol and filtered to prepare each analyte. Afterwards, each analyte was analyzed using an Aquilty UPLC (Ultra Performance Liquid Chromatography, Waters Company) device and an Xevo G2-S QTof mass spectrometer, and the content of unreacted vinyl chloride monomers in the vinyl chloride polymer was measured.

(3) Recovery Rate of Vinyl Chloride Monomer

In each Example and Comparative Example, a change in heat quantity was calculated from the difference in temperature and flow rate between inlet cooling water and outlet cooling water flowing through the condenser and the reactor jacket by using Equation, Q=CMΔT, the amount of monomers used was calculated, from the amount of change in heat quantity (total heat quantity), by using the amount of heat quantity (energy) when a double bond of the monomer was converted into a single bond of the polymer. The amount of unreacted vinyl chloride monomers was measured by excluding the amount of used monomers from the amount of the added vinyl chloride monomers. Assuming that the measured amount of unreacted vinyl chloride monomers was as A and the amount of the recovered vinyl chloride monomer was B, the recovery rate, the percentage of a value of B to A [(B/A)×100], was analyzed.

TABLE 2

| Division | Vinyl chloride monomer concentration (ppm) | | Vinyl chloride monomer recovery rate (%) |
|---|---|---|---|
| | In the discharged dry gas | In vinyl chloride polymer | |
| Example 1 | 0 | 1 | 94 |
| Example 2 | 0 | 1 | 94 |
| Example 3 | 0 | 1 | 94 |
| Comparative Example 1 | 6 | 1 | 92 |
| Comparative Example 2 | 7 | 1 | 92 |
| Comparative Example 3 | 7 | 1 | 92 |
| Comparative Example 4 | 45 | 1 | 80 |
| Comparative Example 5 | 47 | 1 | 80 |
| Comparative Example 6 | 48 | 1 | 80 |

As may be seen from Table 2, in Examples 1 to 3 performed by the post-treatment method of the present invention, the dry gas containing unreacted vinyl chloride monomers are circulated to the latex storage unit and then separated and recovered using water to thereby block discharged gas fundamentally. It may be confirmed that there are no unreacted vinyl chloride monomers discharged to the atmosphere. Then, the unreacted vinyl chloride monomers may be easily recovered from the dry gas using water, and the vinyl chloride monomers are fundamentally blocked from being discharged, thereby obtaining a high recovery rate. In addition, by comparing Comparative Examples 1 to 3 in which typically known stripping prior to drying is performed with Examples 1 to 3, it may be seen that the post-treatment method according to the present invention may recover the discharged vinyl chloride monomer with high efficiency while effectively blocking the discharged vinyl chloride monomer.

In addition, in the case of Comparative Examples 4 to 6, in which a latex stripping process is not performed while using a conventional open post-treatment system, it may also be seen through Comparative Examples 4 to 6 that the post-treatment method according to the present invention is significantly more efficient.

Meanwhile, since the vinyl chloride monomers in the vinyl chloride polymer obtained through all Examples and Comparative Examples have a similar concentration regardless of whether to perform the stripping process, it may be seen that the vinyl chloride monomers remaining in the vinyl chloride polymer is not removed through the stripping process.

The invention claimed is:

1. A post-treatment method of a vinyl chloride-based polymer comprising:
   (a) polymerizing a vinyl chloride-based monomer to prepare a vinyl chloride-based polymer latex;
   (b) preparing a stream containing vinyl chloride-based polymer powder and unreacted vinyl chloride-based monomers by drying the vinyl chloride-based polymer latex in a drying unit;
   (c) filtering the stream containing the vinyl chloride-based polymer powder and the unreacted vinyl chloride-based monomers in a filtering unit; and
   (d) recirculating a gas containing the unreacted vinyl chloride-based monomers discharged from the filtering unit to a latex storage unit; and
   (e) adding water to the latex storage unit to separate the unreacted vinyl chloride-based monomers;
   wherein a latex stripping process is not performed before the drying step (b) and after the step (a) of polymerizing the vinyl chloride-based monomer to prepare the vinyl chloride-based polymer latex.

2. The post-treatment method of claim 1, further comprising transferring a stream containing a vinyl chloride-based polymer latex from the latex storage unit to the drying unit before the drying step (b).

3. The post-treatment method of claim 1, wherein in the filtering step (c), a vinyl chloride-based polymer powder filtered by the filtering unit is obtained.

4. The post-treatment method of claim 1, further comprising (d') recirculating the gas containing the unreacted vinyl chloride-based monomers discharged from the drying unit to the latex storage unit.

5. The post-treatment method of claim 1, wherein the drying step (b) is carried out through spray drying under at an inlet temperature of 100° C. to 250° C.

6. The post-treatment method of claim 1, wherein the vinyl chloride-based polymer powder in the step (b) has an average particle diameter of 10 μm to 200 μm.

7. A closed post-treatment system for performing the post-treatment method of claim 1, the system comprising:
   a latex storage unit;
   a drying unit;
   a filtering unit; and
   a first reflux line installed between the filtering unit and the latex storage unit to transfer a gas containing unreacted vinyl chloride-based monomers discharged from the filtering unit to the latex storage unit.

8. The closed post-treatment system of claim 7, further comprising a latex storage unit rear-stage line installed to transfer a stream containing a vinyl chloride-based polymer latex from the latex storage unit to the drying unit.

9. The closed post-treatment system of claim 7, further comprising:
   a second reflux line installed between the drying unit and the latex storage unit to transfer the gas containing the unreacted vinyl chloride-based monomers discharged from the drying unit to the latex storage unit; and
   a drying unit rear-stage line installed to transfer a stream containing vinyl chloride polymer powder and unreacted vinyl chloride monomers from the drying unit to the filtering unit.

10. The closed post-treatment system of claim 7, further comprising a filtering unit rear-stage line for discharging the vinyl chloride-based polymer powder filtered by the filtering unit.

* * * * *